United States Patent
Hansmann et al.

(10) Patent No.: US 11,016,814 B2
(45) Date of Patent: May 25, 2021

(54) SELECTION OF RANKED SERVICE INSTANCES IN A SERVICE INFRASTRUCTURE

(71) Applicant: International Business Machines Corporation, Armonk, NY (US)

(72) Inventors: Uwe Hansmann, Tuebingen (DE); Timo Kußmaul, Boeblingen (DE); David Winter, Boeblingen (DE); Hendrik Haddorp, Holzgerlingen (DE); Udo Schoene, Boeblingen (DE); Andreas Prokoph, Boeblingen (DE); Oliver Rudolph, Tübingen (DE); Anke Lüdde, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 16/194,270

(22) Filed: Nov. 16, 2018

(65) Prior Publication Data
US 2020/0159592 A1 May 21, 2020

(51) Int. Cl.
*G06F 9/46* (2006.01)
*G06F 9/50* (2006.01)
(Continued)

(52) U.S. Cl.
CPC .......... *G06F 9/5055* (2013.01); *G06F 9/4881* (2013.01); *H04L 67/16* (2013.01); *H04L 67/34* (2013.01)

(58) Field of Classification Search
CPC ....... G06F 9/5055; G06F 9/4881; H04L 67/16
See application file for complete search history.

(56) References Cited

U.S. PATENT DOCUMENTS 8,966,039 B1 * 2/2015 Fultz ................. H04L 67/16
709/223
9,900,176 B2 * 2/2018 Choi .................. H04L 12/2809
(Continued)

OTHER PUBLICATIONS

Github, "Eureka at a glance", GitHub Netflix/eureka Wiki, https://github.com/Netflix/eureka/wiki/Eureka-at-a-glance, [retrieved Nov. 10, 2018].
(Continued)

*Primary Examiner* — Camquy Truong
(74) *Attorney, Agent, or Firm* — North Shore Patents, P.C.; Michele Liu Baillie

(57) ABSTRACT

Embodiments generally relate to selecting a service instance in a service infrastructure. In some embodiments, a method includes sending, by a service registry, a status request to each service instance of a plurality of service instances, where the service registry maintains a data store of performance information associated each of the service instances. The method further includes receiving, by the service registry, a plurality of status responses, where each status response is received from a respective service instance of the plurality service instances, and where each status response includes one or more performance characteristics. The method further includes ranking, by the service registry, the service instances based at least in part on the one or more performance characteristics. The method further includes performing, by the service registry, service lookups based on the ranking.

9 Claims, 6 Drawing Sheets

(51) Int. Cl.
*H04L 29/08* (2006.01)
*G06F 9/48* (2006.01)

(56) References Cited

U.S. PATENT DOCUMENTS

| | | | | |
|---|---|---|---|---|
| 2002/0198960 | A1* | 12/2002 | Robb | G06F 16/902 |
| | | | | 709/217 |
| 2005/0021536 | A1* | 1/2005 | Fiedler | G06Q 10/10 |
| 2010/0161778 | A1* | 6/2010 | Guinard | G06F 9/5027 |
| | | | | 709/222 |
| 2012/0167081 | A1 | 6/2012 | Sedayao et al. | |
| 2014/0007113 | A1* | 1/2014 | Collin | G06F 9/5055 |
| | | | | 718/102 |
| 2015/0355927 | A1 | 12/2015 | Budzinski | |
| 2017/0093961 | A1 | 3/2017 | Pacella et al. | |
| 2018/0068340 | A1* | 3/2018 | Jaidka | G06N 20/00 |
| 2018/0136959 | A1 | 5/2018 | Vyas et al. | |

OTHER PUBLICATIONS

HashiCorp, "Service Made Easy", HashiCorp Consul, https://www.consul.io, [retrieved Nov. 10, 2018].
Ramya, R., et al., "A State-of-Art Load Balancing Algorithms in Cloud Computing", International Journal of Computer Applications (0975-8887) vol. 95—No. 19, https://pdfs.semanticscholar.org/d154/29321d744da90097feef3631a616636c65a8.pdf, Jun. 2014.
Vert.x, "Vert.x Service Discovery", Vert.x, https://vertx.io/docs/vertx-service-discovery/java/, [retrieved Nov. 10, 2018].
Wikipedia, "Load balancing (computing)", Wikipedia, https://en.wikipedia.org/wiki/Load_balancing_(computing), [retrieved Nov. 10, 2018].

* cited by examiner

SELECTION OF RANKED SERVICE INSTANCES IN A SERVICE INFRASTRUCTURE

BACKGROUND

Microservices are small, lightweight applications with relatively simple functionality such as accessing particular data. Microservices, also referred to herein as services, often work with other services to procure needed data. At runtime, multiple instances of a given service are typically running and load balancing techniques are used in order to improve throughput of incoming service requests. If a given service needs to use another service to perform work, a service registry may be used to look up available instances of the service.

SUMMARY

Disclosed herein is a method for selecting a service instance in a service infrastructure, and system and computer program product as specified in the independent claims. Embodiments are given in the dependent claims. Embodiments can be freely combined with each other if they are not mutually exclusive.

In an embodiment, a method includes sending, by a service registry, a status request to each service instance of a plurality of service instances, where the service, registry maintains a data store of performance information associated each of the service instances. The method further includes receiving, by the service registry, a plurality of status responses, where each status response is received from a respective service instance of the plurality service instances, and where each status response includes one or more performance characteristics. The method further includes ranking, by the service registry, the service instances based at least in part on the one or more service characteristics. The method further includes performing, by the service registry, service lookups based on the ranking.

In another embodiment, each status response includes keywords that indicate an internal status. In another aspect, the one or more performance characteristics include internal performance characteristics. In another aspect, the one or more performance characteristics include a cache coverage metric. In another aspect, the one or more performance characteristics include external performance characteristics. In another aspect, the method further includes: generating, by the service registry, a content item that includes at least the one or more of the performance characteristics; and indexing, by a search service, the content item for searching. In another aspect, the method further includes: receiving, by the service registry, a service lookup request; generating, by the service registry, a search query based at least in part on keywords in the service lookup request; sending, by the service registry, the search query to a search service; receiving, by the service registry, search results from the search service; and selecting, by the service registry, a top ranked service instance from the search results.

DETAILED DESCRIPTION

Embodiments described herein facilitate selecting a service instance in a service infrastructure. Embodiments provide improved service lookup methods performed by an extended service registry, which maintains a data store of performance information associated with services and service instances. The performance information includes performance characteristics such as cache metrics, usage history, service state, error conditions, etc. The extended service registry takes into account the performance characteristics of service instances to be invoked during service lookups. For example, the extended service registry ranks service instances based on their respective performance characteristics, and selects top-ranked service instances to be invoked in response, to service lookup requests. Conventional service registries merely select service instances to be invoked based on availability or may use round-robin techniques for load balancing. While additional load balancing techniques may be used, embodiments described herein select optimal service instances so as to not require load balancing or at least minimize the need for load balancing and provide better response times and less load on the overall system.

In various embodiments, a system sends a status request to each service instance of a plurality of service instances. The system receives multiple status responses, where each status response is received from a respective service instance of multiple services. In various embodiments, each status response includes one or more performance characteristics. The system then ranks the service instances based at least in part on the one or more service characteristics. The system performs service lookups based on the ranking.

As described in more detail herein, when the system receives a service request, the system generates a lookup request and generates a search query based at least in, part on keywords in the service lookup request. The system then sends the search query to a search service, which performs a search in the data stored in the search index. The system receives search results from the search service and then selects a top ranked service instance from the search results. The system then sends the address of the top ranked service instance to the API gateway for invocation of the service instance.

Figure 1:
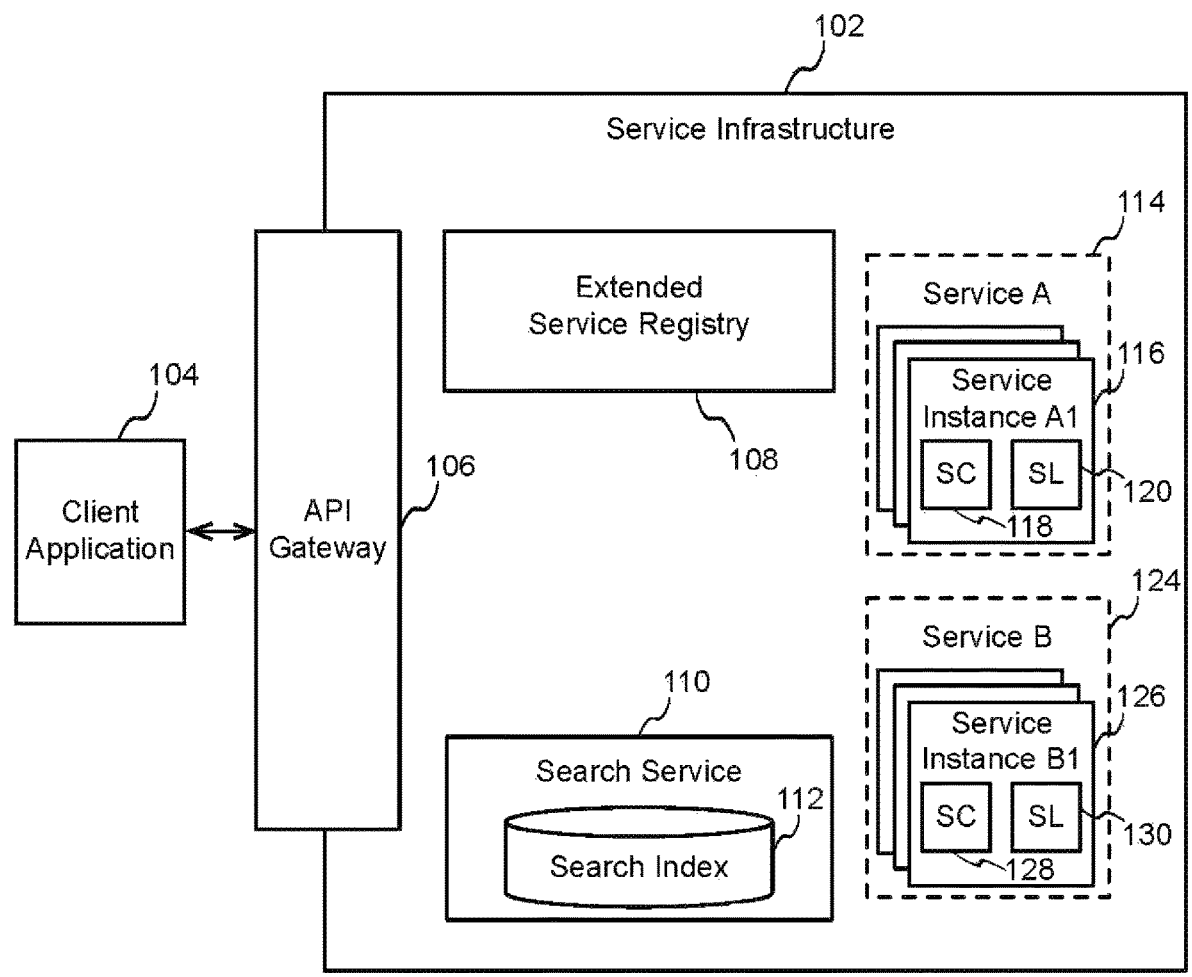
FIG. 1 is an example service infrastructure environment, according to some embodiments.

FIG. 1 is an example service infrastructure environment 100, according to some embodiments. Shown is a service infrastructure 102, which provides services and service instances to a client application 104. As used herein, the term "service infrastructure" 102 may also be referred to as simply "system" 102. Client application 104 communicates with service infrastructure 102 via an API gateway 106. In various embodiments, service infrastructure 102 and its associated search service serve multiple users and multiple tenants. A tenant is a group of users (e.g., a company) who share a common access with specific privileges to the software instance. Service infrastructure 102 ensures that tenant specific data is isolated from other tenants. Typically, client requests and service requests contain a tenant identifier (ID) of the tenant, which is associated with a request. This enables the service infrastructure component to establish the required context and state for processing the request.

Client application 104 may connect with API gateway 106 via any suitable network or combination of networks such as the Internet, etc. and use any suitable communication protocols such as Wi-Fi, Bluetooth, etc. Service infrastructure 102 may be built on the basis of cloud computing. API gateway 106 provides access to client applications like Smartphone applications, desktop applications, scripts executed in a browser etc. API gateway 106 receives service requests issued by client applications, and creates service lookup requests based on service requests.

As shown, service infrastructure 102 includes an extended service registry 108 and a search service 110. Search service 110 includes a search index 112. Search service 110 provides indexing and query functionality that is used by extended service registry 108. As described in more detail herein, extended service registry 108 looks up service instances in response to a service lookup request such as one from API gateway 106 in response to a service request from client application 104. Extended service registry 108 may use search service 110 and search index 112 to look up service instances.

Shown is service 114 (labeled Service A), which includes multiple services instances such as service instance 116 (labeled Service Instance A1). Other service instances are indicated by the stack boxes behind service instance 116. As shown, service instance 116 includes a status creation unit (labeled SC) 118 for create status responses and a service lookup unit (labeled SL) 120 for facilitating with service lookup requests (e.g., determining keywords from a service lookup, etc.).

In various implementations, the system may have multiple services. For example, also shown is service 124 (labeled. Service B), which includes multiple services instances such as service instance 126 (labeled Service Instance B1). Other service instances are indicated by the stack boxes behind service instance 126. As shown, service instance 126 includes a status creation unit (labeled SC) 128 for create status responses and a service lookup unit (labeled SL) 130 for facilitating with service lookup requests.

In various implementations, each of the multiple instances may run independently on multiple computing systems. As indicated herein, service instance 116, service instance 126, as well as other service instances of service infrastructure 102 are registered in extended service registry 108. Also, any given service instance that is part of service infrastructure 102 may lookup another service instances or service instances. Such lookup requests may come from inside and/or from outside service infrastructure 102.

In some embodiments, extended service registry 108 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 108 ranks service instances based on their respective performance characteristics, and selects top-ranking service instances for service discovery or service lookup requests. In the event that a service instance becomes unresponsive or, unhealthy, the service registry will no longer provide its address or information about this service instance to other services.

Conventional service registries require some form of load balancing, which can be costly to implement. As indicated above, while additional load balancing techniques may be used in combination with implementations described herein, extended service registry 108 selects optimal service instances such that the need for load balancing is not required or at least minimized. This reduces resource requirements, and reduces computation time. While conventional load balancing mechanisms are based merely on the external state of a given service instance, implementations described herein select the best service instance to perform the needed work based on internal performance characteristics, as described herein.

In some embodiments, extended service registry 108 may also incorporate a load-balancing algorithm for distributing load among service instances like random choice, round robin, or least connections.

As described in more detail herein, a service registers at extended service registry 108, usually immediately after starting, e.g., by sending a registration request including its address, a service identifier or a set of identifiers of APIs provided by the service instance, etc. Extended service registry 108 regularly invokes health checks (e.g., status requests) on each registered service instance. As described in more detail herein, the invoked service instance will then respond by returning status information. In some embodiments, this status information may contain a flag indicating whether the service instance is healthy or unhealthy. If the returned status indicates a problem or if the service instance does not respond in time, the service registry will flag this service instance as unhealthy. As such, extended service registry 108 selects a service instance based on two simple criteria: a binary flag representing the health status, and a service identifier like a service name.

As described in more detail herein, extended service registry 108 periodically initiates a status request for each service instance. In various embodiments, search service 110 provides functionality for searching in unstructured data such as text documents. Search service 110 provides functionality to create search index 112 by indexing content items such as text documents. Search index 112 contains a representation of the content, which is well suited for highly efficient, processing by search service 110. Search service 110 provides an API for indexing content items, which makes the content item searchable by search service 110. Search service 110 also provides a query API, which allows a client (e.g., a service or service instance, or an application, etc.) to issue a search query. A search query contains a set of query parameters that specify criteria for searching content items, such as a set of search terms. Search service 110 processes the query by selecting and ranking a set of content items according to the query. The ranking determines a scoring or an order of the content items relative to the search query, which represents, how relevant a content item is in relation to a search query. In some embodiments, there may be multiple ranking functions. The query may also contain parameters for controlling the ranking like a ranking query, a boost query, or a boost function, or the search service may automatically select the heuristics and parameters for the ranking. Ranking may be based on statistics about the search corpus and the search terms, as well as statistics about the occurrence of search terms in specific content items etc.

In various embodiments, there may be various ranking methods such as term, frequency—inverse document frequency (TF-IDF), which is a numerical statistic that is intended to reflect how important a word is to a document in a collection or corpus. A TF-IDF value may be used as a weighting factor in ranking a document's relevancy in search services relative to a given query. A TF-IDF value increases proportionally to the number of times a word, appears in the document and is offset by the frequency of the word in the corpus.

In various embodiments, search service 110 may manage multiple indexes in a multi-tenant environment (e.g., by creating a separate index for each tenant, etc.). Search service 110 correctly selects a correct index to use for search requests depending on the tenant context.

In various embodiments, search index 112 may be associated with a specific search configuration, consisting of multiple configuration settings. Such configuration settings may control search functionality, behavior, and the structure of the content items in the index, for example. In some embodiments, a user may update the configuration parameters through a search service API, or by uploading a set of configuration files to the search service or a file system or a persistent storage that the search service is using.

In various embodiments, in a service-oriented architecture, a service or service instance is a software component that provides an API, which can be accessed or invoked by other services or service instances or software components using a standard protocol or a standard invocation mechanism. A service instance may be implemented, created, removed, deployed, started and stopped independently of other service instances. A microservice is a service that is designed to be lightweight and granular. As used herein, the term service and the term microservice may be used interchangeably.

In some embodiments, there may be multiple instances of one service running in order to improve fault tolerance, throughput, and load balancing of requests. Each of a service's instances provides the same APIs and the same functionality, and is based on the same implementation (e.g. code, docker image, deployment artifact, etc.).

Service instances interact by sending requests for invoking operations to one of the APIs provided by a service instance. The requests usually contain an identifier of the requested API operation (e.g. in the form of a URL or another parameter) as well as further data that is relevant for processing the request.

Usually there is at least one service registry in a service infrastructure that provides functionality for service discovery or service lookup. Extended service registry 108 manages information about the active/running service instances in the service infrastructure.

In various embodiments, extended service registry 108 intelligently selects service instances based on performance for processing a given service request. In various embodiments, service instances typically use state of the art software engineering mechanisms such as caching, persistent storage, session and state management, connection and thread pooling etc. For example, caching improves performance significantly. Usually the system caches data that was recently used, e.g., while processing recent requests. Since requests are distributed between service instances, the individual service instances normally have different cache entries. In other words, the state of the service instance depends on its individual usage history. Service instance performance depends on whether data relevant for request processing is available in the cache or not. As such, performance for processing the same request may differ between individual service instances.

Generally performance depends heavily on the data in the cache. Embodiments described herein provide detailed information about cache contents between service instances and service registries.

While various components of service infrastructure 102 such as extended service registry 108 are described as performing some embodiments described herein, in other embodiments, any suitable component or combination of components associated with the overall system or service infrastructure 102, including any suitable processor or processors associated with the system may facilitate performing the embodiments described herein. In various embodiments, service infrastructure environment 100 may not have all of the components shown and/or may have other elements including other, types of elements instead of, or in addition to, those shown herein.

Figure 2:
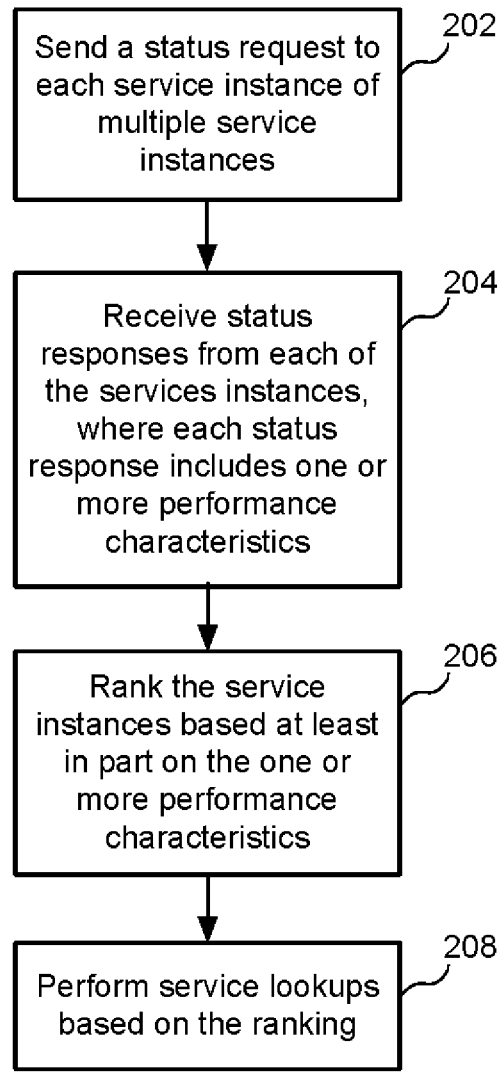
FIG. 2 is an example flow diagram for selecting a service instance in a service infrastructure, according to some embodiments.

FIG. 2 is an example flow diagram for selecting a service instance in a service infrastructure, according to some embodiments. In various embodiments, the steps of the flow diagram of FIG. 2 are performed by extended service registry 108 of FIG. 1 in order to enable optimal service lookups. Referring to both FIGS. 1 and 2, a method begins at block 202, where extended service registry 108 of system 102 sends a status request to each service instance of multiple service instances. Extended service registry 108 periodically sends the status requests to track performance characteristics of the service instances. As indicated herein, extended service registry 108 maintains a data store of performance information associated each of the service instances. In various embodiments, such, performance information may include various types of performance characteristics of a given service instance (e.g., cache metrics, etc.).

At block 204, extended service registry 108 receives status responses from each of the service instances. In various embodiments, each status response includes one or more performance characteristics. Such status responses function as regular heartbeats that extended service registry 108 uses to select service, instances for invocation.

In various embodiments, each status response includes keywords that indicate an internal status. In some embodiments, one or more of the performance characteristics may include internal performance characteristics. Internal performance characteristics may include, for example, non-functional requirements such as costs and other quality of service instance criteria (e.g., volume of transferred data etc.).

In some embodiments, one or more of the performance characteristics may include a cache coverage metric. Generally performance of a given service instance depends heavily on the data in the cache. As such, the performance characteristics include information about the nature of the data in the cache in the form of a set of keywords. In some embodiments, the keywords may include whether the cache coverage exceeds a defined threshold. The keywords may also include tenant identification (ID), tenant name, tenant preferred datacenter, etc. The keywords may also include a set of recently called APIs, and/or portions of the API routes that were called in a defined timeframe by one of the tenants whose cache coverage exceeds the defined threshold. Keywords may also include responsiveness and data processed by the service instance. In some embodiments, one or more of the performance characteristics may also include external performance characteristics.

At block 206, extended service registry 108 ranks the service instances based at least in part on the one or more performance characteristics. In various embodiments, extended service registry 108 ranks the service instances based on particular requirements of the service lookup request In some implementations, the result of the query is one ranked result list. The keyword in the query describes the internal and external characteristics of the desired service instance. In various implementations, extended service registry 108 may use multiple algorithms to perform the ranking. In various embodiments, extended service registry 108 may rank the service instances based on internal characteristics such as cache coverage metrics, etc. Extended service registry 108 may also rank the service instances based on external characteristics, etc. In some implementations, external characteristics may include information such as: How many requests were routed to the service instance recently, what is the (geo)location of the instance, etc.

In various embodiments, service registry 108 generates a content item that includes at least the one or more performance characteristics in the form of keywords, as well as other keywords obtained from each service instance (e.g., service ID, service API ID, etc.). Search service 110 then indexes the content item for searching. Each content item may include keywords, a service identifier, service address, etc. In some embodiments, service registry may invoke a search service to index the content item.

In various embodiments, extended service registry 108 uses internal and/or external characteristics of a given service instance to determine if a given service instance is available. Extended service registry 108 also ranks service instances from a load balance perspective. For example, to improve throughput and performance of the service instance performing a specific task, extended service, registry 108 takes into account internal characteristics of a service instance during load balancing, such as what tasks a given service instance recently performed, which data is still available to the service instance without going back to a backend database or service instance (e.g., in cache), what response time the service instance received from other backend services used by this particular service instance, etc.

At block 208, extended service registry 108 performs service lookups based on the ranking. Example embodiments directed to extended service registry 108 performs service lookups are described in more detail herein, for example in connection with FIG. 5.

Embodiments described herein provide various benefits. For example, embodiments provide improved service lookups that account for important internal characteristics of service instances. Embodiments enhance performance and resilience in a service instance and cloud environment.

Figure 3:
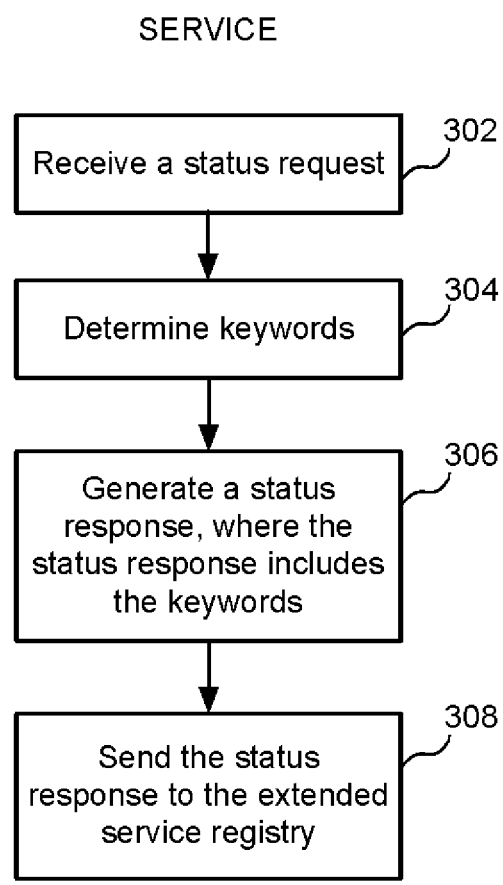
FIG. 3 is an example flow diagram for generating a status response, according to some embodiments.

FIG. 3 is an example flow diagram for generating a status response, according to some embodiments. In various embodiments, the steps of the flow diagram of FIG. 3 are performed by each service instance in order to provide status information including performance characteristics to extended service registry 108. Referring to both FIGS. 1 and 3, a method begins at block 302, where status creation unit 116 of service instance 114 receives a status request from extended service registry 108.

At block 304, service lookup unit 116 of service instance 114 determines keywords. In various embodiments, the keywords may be derived from the status request, and may be based on request payload data, request headers, an address or other information about the issuer of the request or usage statistics, etc. For example, service lookup unit 116 may retrieve the tenant ID of the tenant associated with the request. Service lookup unit 116 may also retrieve the name/ID of the API to be invoked on another service instance, etc.

The data is created by the service instances to represent internal characteristics such as performance metrics including usage history, cache and memory usage, service or system state, error conditions, etc. As indicated above, the cache coverage metric is a performance characteristic. In some embodiments, the service checks the cache content by computing a new tenant-specific cache coverage metric (e.g., what ratio of a tenant's service relevant data is contained in the service instance's cache).

In some embodiments, status creation unit 118 determines the tenant IDs that are associated with the current cache keys and cache values. Status creation unit 118 calculates the metric as the ratio of the cache entries associated with the specific tenant in relation to all cache entries. If the cache coverage exceeds a defined threshold, the service instance generates set of keywords to be sent to the service registry. Such keywords may include the fact that the cache coverage exceeds a defined threshold. The keywords may also include tenant identification (ID), tenant name, tenant preferred datacenter, etc., and this information may be acquired from a tenant registry. Such data may be obtained efficiently from the caches instead of retrieving the data from persistent storage.

In some embodiments, status creation unit 118 keeps a history of previous requests and selects the tenant IDs of tenants that are associated with one or more previous requests. The service instance may also provide keywords representing a set of recently invoked APIs, including portions of API routes that were called in a defined timeframe by one of the tenants whose cache coverage exceeds the defined threshold. Keywords may also include responsiveness and data processed by the service instance.

In some embodiments, keywords may alternatively be created from request payload data, request headers, an address or other information about the issuer of the request or usage statistics. To do so, status creation unit 116 maintains a history of previously received requests, including the request payloads, request headers and the address of the issuer/sender of the request. When creating the keywords for the status response, status creation unit 116 may consider the request payloads, request headers and request issuer address and usage statistics available from the request history. For example, status creation unit 116 may select values of request headers from a predefined list of request headers and includes these values in the keywords. Alternatively, status creation unit 116 may include the issuer address as a keyword or data elements from the payload data.

In the service lookup flow, service lookup unit 116 of service instance 114 may create a set of keywords by extracting predefined data elements from the request, headers and/or the request payload that is to be included in the invocation request to the service instance that is currently looked up. Service lookup unit 116 may also include its address as a keyword.

As such, a ranking component of the search service 110 is able to take into account the request payload, request header elements, and issuer address that are contained in the search query. The ranking component of the search service 110 is also able to take into account the request payload, request header elements, and issuer address that are contained in the content items. This increases the ranking for content items representing service instances that previously processed requests similar to the actual request. In various embodiments, the caching and the internal state of the selected service instance allows efficient processing of the request.

In various embodiments, the keywords need not conform to a general format or template. For example, the keywords may be in the form of semi-structured data and/or unstructured data representing internal characteristics of the service instances. The keywords may be in various formats such as JavaScript object notation (JSON), extensible markup language (XML), text, etc.

At block 306, status creation unit 118 generates a status response, where the status response includes the keywords.

At block 308, status creation unit 118 sends the status response to extended service registry 108.

Figure 4:
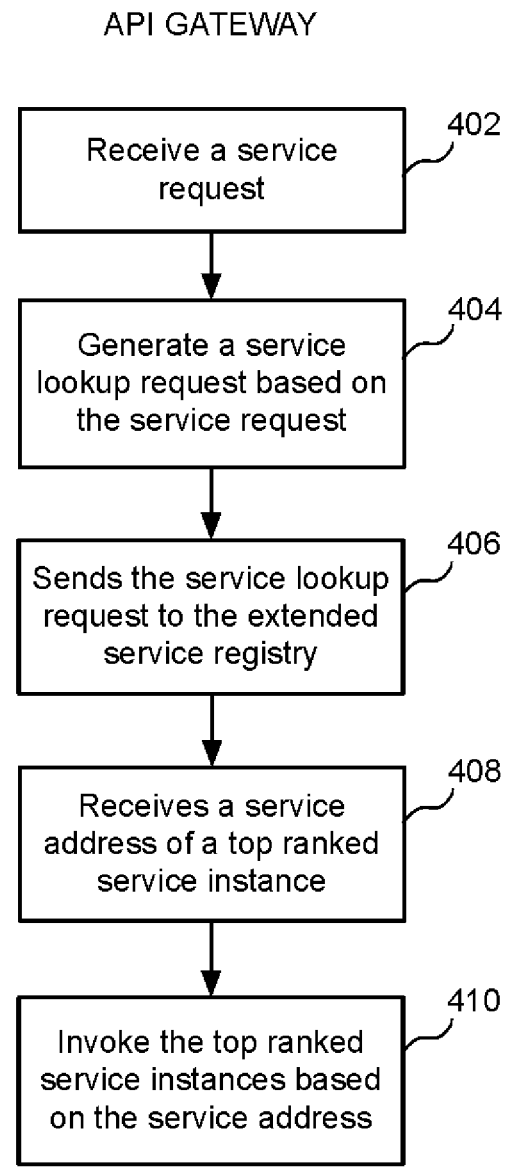
FIG. 4 is an example flow diagram for finding a service instance in response to a service request, according to some embodiments.

FIG. 4 is an example flow diagram for finding a service instance in response to a service request, according to some embodiments. In various embodiments, the steps of the flow diagram of FIG. 4 are performed by API gateway 106, which sends service lookup requests to extended service, registry 108 in response to service requests from client application 104. Referring to both FIGS. 1 and 4, a method begins at block 402, where the API gateway 106 of service infrastructure 102 receives a service request from client application 104.

At block 404, API gateway 106 generates a service lookup request based on the service request received from a client application such a client application 104. In some embodiments, API, gateway 106 determines a set of keywords based on the service request. Such keywords may include requirements from the service request.

At block 406, API gateway 106 sends the service lookup request to extended service registry 108.

At block 408, API gateway 106 receives a service address of a top ranked service from extended service registry 108.

At block 410, API gateway 106 invokes the top ranked service instance based on the service address. Embodiments described herein improve service lookups, including improving service of quality, performance, and costs of the service infrastructures. This is achieved in part by invoking top-ranked service instances selected by extended service registry 108, where extended service registry 108 takes into account performance characteristics of the service instances.

Figure 5:
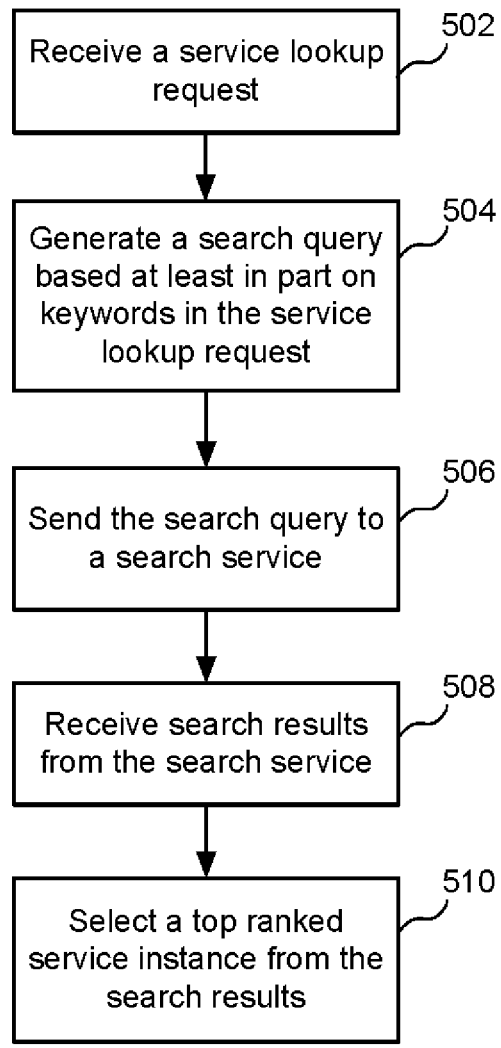
FIG. 5 is an example flow diagram for performing a service lookup in response to a service lookup request, according to some embodiments.

FIG. 5 is an example flow diagram for performing a service lookup in response to a service lookup request, according to some embodiments. In various embodiments, the steps of the flow diagram of FIG. 5 are performed by extended service registry 108 in response to service lookup requests from API gateway 106. As described in more detail below, extended service registry 108 selects top-ranked service instances based on their respective performance characteristics. Referring to both FIGS. 1 and 5, a method begins at block 502, where extended service registry 108 of service infrastructure 102 receives a service lookup request, which includes keywords such as tenant ID, tenant preferred datacenter, etc.

At block 504, extended service registry 108 generates a search query based at least in part on keywords in the service lookup request. As indicated above, in various embodiments, the keywords may be derived from the service request, and may be based on request payload data, request headers, address or other information about the issuer of the request or usage statistics, etc.

In some embodiments, extended service registry 108 may generate a search query that also includes a set of boost queries created from the keywords in the service lookup request. For example, extended service registry 108 may create boost queries for the tenant ID and API names in the lookup request. A boost query may look like, "bq=keywords:<tenantid>^10" and "bq=keywords:<API-name>^5", for example.

At block 506, extended service registry 108 sends the search query to search service 110. This invokes search service 110 to process the search query. In some embodiments, search, service 110 may uses any suitable techniques to search and rank the content items based on the search query. In some embodiments, the ranking is in particular may be based on the boost queries which were created from the keywords.

At block 508, extended service registry 108 receives search results from search service 110. Search service 110 returns a ranked list of search documents that are ranked according to the relationship between the query terms and the search documents.

At block 510, extended service registry 108 selects a top ranked service instance from the search results. Extended service registry 108 then retrieves the service instance ID, service ID, service address, etc. from the top ranked search document and returns this information to API gateway 106 as a service lookup result.

Figure 6:
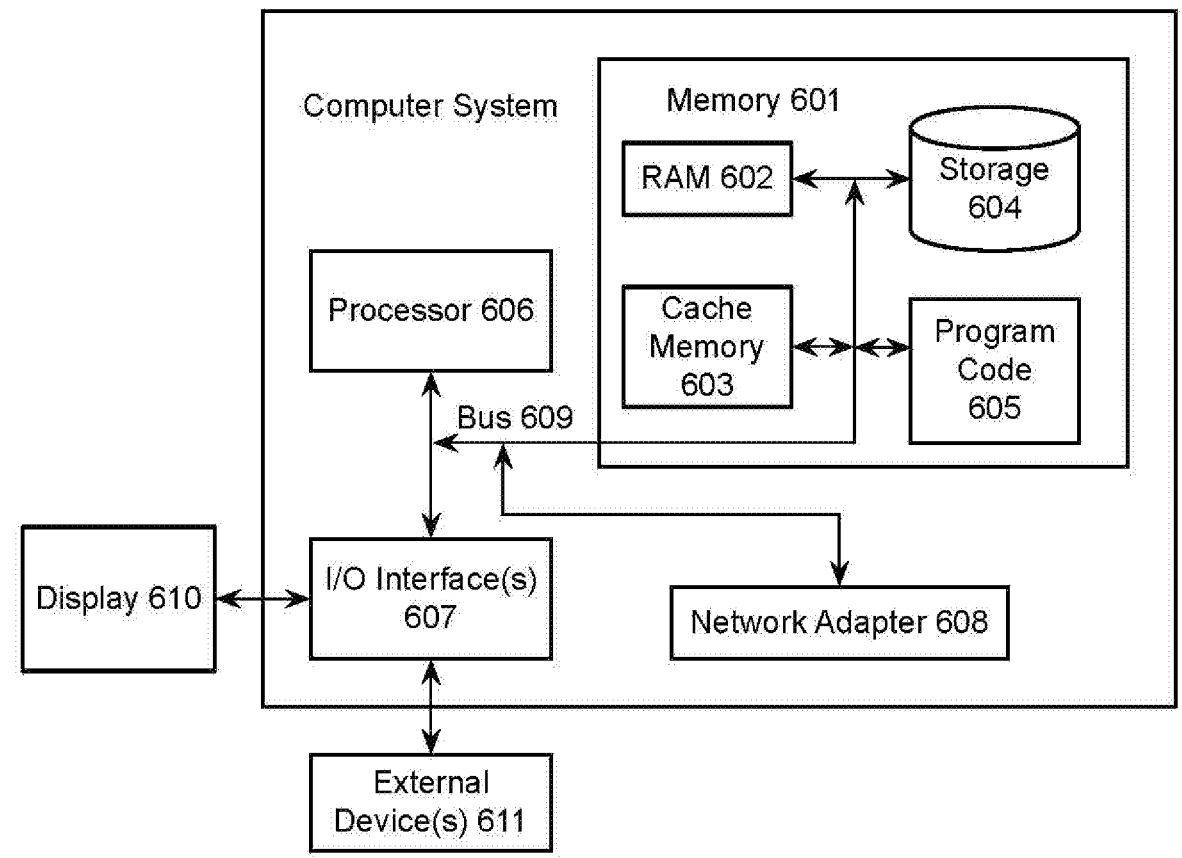
FIG. 6 is a block diagram of an, example computer system, which may be used for embodiments described herein.

FIG. 6 is a block diagram of an example computer system 600, which may be used for embodiments described herein. The computer system 600 is operationally coupled to one or more processing units such as processor 606, a memory 601, and a bus 609 that couples various system components, including the memory 601 to the processor 606. The bus 609 represents one or more of any of several types of bus structure, including a memory bus or memory controller, a peripheral bus, an accelerated graphics port, and a processor or local bus using any of a variety of bus architectures. The memory 601 may include computer readable media in the form of volatile memory, such as random access memory (RAM) 602 or cache memory 603, or storage 604, which may include non-volatile storage media or other types of memory. The memory 601 may include at least one program product having a set of at least one program code module such as program code 605 that are configured to carry out the functions of embodiment of the present invention when executed by the processor 606. The computer system 600 may also communicate with a display 610 or one or more other external devices 611 via input/output (I/O) interfaces 607. The computer system 600 may communicate with one or more networks via network adapter 608.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in, the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable, storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via, a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   at least one processor and a computer readable storage medium having program instructions embodied therewith, the program instructions executable by the at least one processor to cause the at least one processor to perform operations comprising:
   sending, by a service registry, a status request to each service instance of a plurality of service instances of a service, wherein each service instance provides shared access to a plurality of tenants;
   for each service instance of the plurality of service instances:
      receiving, by the service registry, a status response from a given service instance of the plurality of service instances, wherein the status response comprises a first set of keywords, the first set of keywords comprising a cache coverage metric, wherein the cache coverage metric is calculated as a ratio of cache entries associated with a given tenant of the plurality of tenants to all cache entries in a cache of the given service instance;

storing in a data store, by the service registry, the first set of keywords associated with the given service instance;

receiving, by the service registry, a service lookup request from a client application, the service lookup request comprising a second set of keywords, the second set of keywords comprising performance characteristic requirements;

identifying, by the service registry, given service instances of the plurality of service instances associated with the first sets of keywords matching the second set of keywords;

ranking, by the service registry, the given service instances based at least on the cache coverage metrics in the first sets of keywords associated with the given service instances;

selecting, by the service registry, a top ranked service instance from the given service instances; and returning, by the service registry, the top ranked service instance as a response to the service lookup request.

2. The system of claim 1, wherein the first set of keywords further comprises external performance characteristics.

3. The system of claim 1, wherein the at least one processor further performs operations comprising:

generating, by the service registry, a content item that includes at least the first set of keywords; and indexing, by a search service, the content item for searching.

4. A computer program product comprising a computer readable storage medium having program instructions embodied therewith, the program instructions executable by at least one processor to cause the at least one processor to perform operations comprising:

sending, by a service registry, a status request to each service instance of a plurality of service instances of a service, wherein each service instance provides shared access to a plurality of tenants;

for each service instance of the plurality of service instances:
receiving, by the service registry, a status response from a given service instance of the plurality of service instances, wherein the status response comprises a first set of keywords, the first set of keywords comprising a cache coverage metric, wherein the cache coverage metric is calculated as a ratio of cache entries associated with a given tenant of the plurality of tenants to all cache entries in a cache of the given service instance;

storing in a data store, by the service registry, the first set of keywords associated with the given service instance;

receiving, by the service registry, a service lookup request from a client application, the service lookup request comprising a second set of keywords, the second set of keywords comprising performance characteristic requirements;

identifying, by the service registry, given service instances of the plurality of service instances associated with the first sets of keywords matching the second set of keywords;

ranking, by the service registry, the given service instances based at least on the cache coverage metrics in the first sets of keywords associated with the given service instances;

selecting, by the service registry, a top ranked service instance from the given service instances; and returning, by the service registry, the top ranked service instance as a response to the service lookup request.

5. The computer program product of claim 4, wherein the first set of keywords further comprises external performance characteristics.

6. The computer program product of claim 4, wherein the at least one processor further performs operations comprising:

generating, by the service registry, a content item that includes at least the first set of keywords; and indexing, by a search service, the content item for searching.

7. A computer-implemented method for selecting a service instance in a service infrastructure, the method comprising:

sending, by the service registry, a status request to each service instance of a plurality of service instances of a service, wherein each service instance provides shared access to a plurality of tenants;

for each service instance of the plurality of service instances:
receiving, by the service registry, a status response from a given service instance of the plurality of service instances, wherein the status response comprises a first set of keywords, the first set of keywords comprising a cache coverage metric, wherein the cache coverage metric is calculated as a ratio of cache entries associated with a given tenant of the plurality of tenants to all cache entries in a cache of the given service instance;

storing in a data store, by the service registry, the first set of keywords associated with the given service instance;

receiving, by the service registry, a service lookup request from a client application, the service lookup request comprising a second set of keywords, the second set of keywords comprising performance characteristic requirements;

identifying, by the service registry, given service instances of the plurality of service instances associated with the first sets of keywords matching the second set of keywords;

ranking, by the service registry, the given service instances based at least on the cache coverage metrics in the first sets of keywords associated with the given service instances;

selecting, by the service registry, a top ranked service instance from the given service instances; and returning, by the service registry, the top ranked service instance as a response to the service lookup request.

8. The method of claim 7, wherein the first set of keywords further comprises external performance characteristics.

9. The method of claim 7, wherein the method further comprises:

generating, by the service registry, a content item that includes at least the first set of keywords; and indexing, by a search service, the content item for searching.

* * * * *